June 6, 1933.  L. F. KENNEDY  1,913,203
PROTECTIVE APPARATUS
Filed May 27, 1930
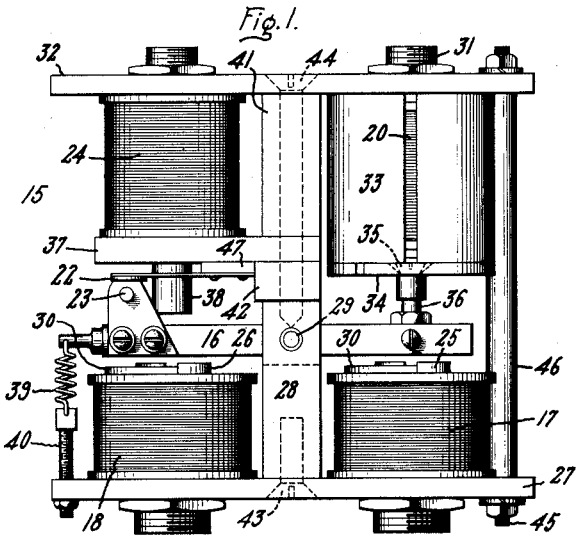
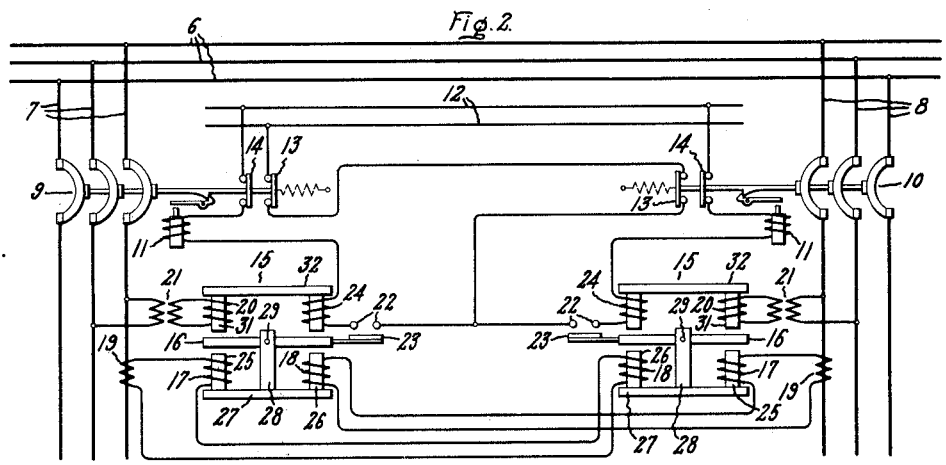
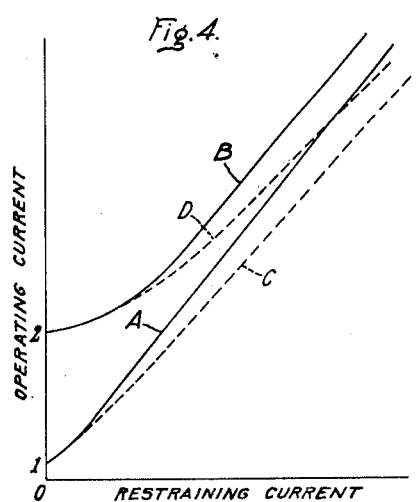
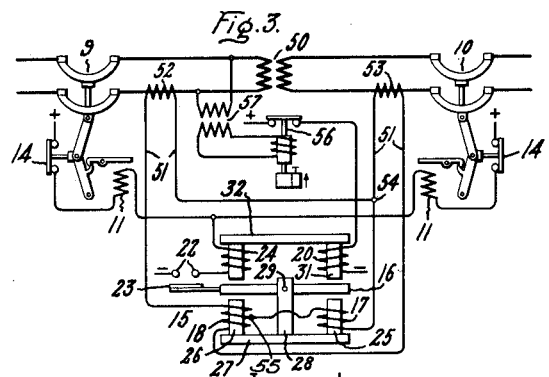
Inventor:
Luke F. Kennedy,
by Charles E. Tullar
His Attorney.

Patented June 6, 1933

1,913,203

UNITED STATES PATENT OFFICE

LUKE F. KENNEDY, OF PHILADELPHIA, PENNSYLVANIA, ASSIGNOR TO GENERAL ELECTRIC COMPANY, A CORPORATION OF NEW YORK

PROTECTIVE APPARATUS

Application filed May 27, 1930. Serial No. 456,202.

My invention relates to improvements in protective apparatus for electric systems and more particularly to improvements in protective apparatus including relays for obtaining an effect dependent on the relative values of an electric quantity of a system at two points thereof. An object of my invention is to provide improved protective apparatus whose sensitivity of response to the relative values of electric quantities of a system is automatically varied in accordance with system conditions such as faults, switching surges, exciting currents, etc., whereby to secure the maximum protection commensurate with the desired continuity of service.

The sensitivity of protective apparatus, for example overcurrent relays, is limited by the maximum safe load that must be carried so that, in case of light load periods when the generating capacity is small, an actual fault may not result in sufficient current to operate the relays because they have a fixed setting which can be varied only by manual operation. However, it is not always convenient or practical in these days of extensive system interconnections and quick load changes manually to change the relay settings. On the other hand, in the protection of inductive apparatus which is subject to magnetizing inrush currents, these currents may be greater than the desired fault current setting of the protective apparatus so that special arrangements become necessary in order to permit the connection of such apparatus. Another object of my invention is to provide protective apparatus which is more sensitive under actual fault conditions than under the maximum load conditions to which the line may be subjected.

Also in the case of circuits operated in parallel and relayed on a current balance basis, it is frequently difficult to restore a second line to service unless a definite switching routine is followed because with one line in service the attempt to put another line in service results in temporarily producing the very unbalanced condition for which the protective apparatus is designed to operate although there is no real faulty condition. A further object of my invention is to provide improved protective apparatus for an electric system having two parallel lines whereby to obtain a selective action dependent on the relative values of the line currents and on the line voltages so that the switching of the lines can be successfully accomplished independently of the order in which the switching operations are performed.

Inasmuch as system stability becomes more important as system interconnections increase, it is desirable in order to maintain the maximum continuity of service to eliminate that part of a system subjected to a fault as quickly as possible in order to prevent, for example, the loss of synchronous load. A still further object of my invention is then to provide an improved protective apparatus which operates so quickly in response to faults as substantially to prevent unstable operating conditions on the sound portions of the system.

My invention will be better understood from the following description when considered in connection with the accompanying drawing and its scope will be pointed out in the appended claims.

In the accompanying drawing, Fig. 1 illustrates a side elevation of a protective relay embodying my invention; Fig. 2 illustrates diagrammatically an embodiment of my invention in a balanced protective apparatus for an electric system having two parallel lines; Fig. 3 illustrates diagrammatically an embodiment of my invention in a balanced protective arrangement for inductive apparatus such as a transformer; and Fig. 4 illustrates characteristics of protective relays embodying my invention.

In the embodiment of my invention shown in Fig. 2, there is illustrated part of a polyphase electric system including a bus 6 to which are connected parallel lines 7 and 8 through suitable circuit interrupting means such as latched-closed circuit breakers 9 and 10 respectively. Each of these circuit breakers is provided with a trip coil 11 which is arranged to be energized from a control bus 12 and also with auxiliary switches 13 and 14 which are closed when the circuit breaker is closed and open when the circuit breaker is open. The type of circuit breaker shown is chosen merely for the purpose of illustration and forms per se no part of my invention. It is, however, to be understood that where it is desirable to obtain very quick circuit interruption, high speed circuit breakers, examples of which are well known to the art, may be employed.

In accordance with my invention, I so control the circuit breakers 9 and 10 selectively in accordance with the relative values of electric quantities of a system by relay means 15 that the minimum operating value of one of the quantities effective to cause a controlling action is varied in accordance with a system condition. This, in effect, so changes the sensitivity of the relay 15 as to insure the maximum protection and continuity of service. As shown in Fig. 2, the electric quantity, whose values are chosen for comparison, is the system current as appearing in the lines 7 and 8 or more specifically as appearing in corresponding phase conductors of these lines. For controlling the sensitivity of response to system conditions, such for example as faults, I employ, in accordance with the principle of my invention, a voltage of the system and preferably the voltage most affected by the fault.

The relay 15, of which one is shown schematically in Fig. 2 for each line, is of the electromagnetic pivoted armature type although my invention is not so limited as it will be obvious to others skilled in the art that it can be embodied in other types of relay construction such as the dynamometer and induction disc types for example. As shown, the relay 15 includes a movable member such as a magnetic armature 16 and controlling means therefor including operating and restraining windings 17 and 18 respectively connected to be energized by the currents of the line with which the relay is associated and the other line through suitable means such as current transformers 19 and a second restraining means including a winding 20 connected to be energized in accordance with the voltage of the associated line through suitable means such as potential transformers 21. For controlling the circuits of the trip coils 11 and through them the circuit breakers 9 and 10, the relay is provided with relatively movable cooperating contacts 22, 23 the latter of which may be in the form of a bridging contact movable with the armature 16. In order to maintain a good firm contact without bouncing due to the high speed of operation, I may also provide a holding winding 24 which, as shown, is connected in series with the relay contacts so as to be energized from the control bus 12 simultaneously with the contact closure.

Referring now more particularly to Fig. 1 for details of the relay the magnetic structure of the operating and restraining windings 17 and 18 includes, besides the armature 16, the preferably adjustably positioned cores 25 and 26, a magnetic yoke member 27 on which the cores are mounted and an intermediate magnetic member 28 which is secured to the yoke and on which the armature is pivoted at 29. In order to minimize the variations in operating values due to phase angle, the cores of the current operating and restraining windings are preferably shaded by suitable means such as short-circuited windings 30. This shading of the cores prevents the restraint from becoming zero and thereby eliminates faulty operation from through surges.

The magnetic circuit of the voltage restraining winding 20 includes a core 31 which is preferably adjustably positioned in an upper magnetic yoke member 32. In order to prevent stray or leakage flux from distorting the operating characteristics of the relay, I so arrange the voltage restraining winding 20 that its magnetic circuit is substantially magnetically independent of the armature 16. For this purpose, the voltage restraining winding 20 may be substantially enclosed by magnetic material such as an iron shell 33 with which and the core 31, the movable member or auxiliary armature 34 of the voltage restraining winding cooperates. In order that the restraining effect of the voltage winding 20 may be effective on the armature 16, the auxiliary armature 34 may be mounted thereon. Moreover, in order to insure that the relay is quiet in normal operation, I so arrange the auxiliary armature 34 that it is self-aligning. For this purpose, it may be loosely mounted on the main armature 16 so as to permit a variation in angularity between this armature and itself. This may be accomplished in any suitable manner. The arrangement shown comprises a screw 35 having a counter-sunk head of a shape differing from the hole of the armature 34 through which the screw projects into a preferably non-magnetic stud 36 carried by the armature 16. In order that the relative positions of the armatures may be varied for different adjustments of the relay, the stud 36 may be adjustably positioned with reference to the armature 16 as shown in Fig. 1.

In the embodiment of my invention shown in Fig. 1, the holding winding 24 is supported between the upper magnetic yoke member 32 and a non-magnetic member 37 which may be of insulating material. The core 38 of the holding winding may be adjustably positioned in the yoke 32 as shown. In the arrangement shown, the holding effect of the coil 24 on the armature 16 is due principally to leakage flux.

In order to adjust the minimum operating point of the relay when the restraints, both voltage and current, are substantially zero, suitable adjusting means such as a spring 39 and screw 40 may be employed. The spring 39 has the additional advantage of causing the opening of the relay contacts against the effect of any residual magnetism of the holding coil magnetic circuit when the line with which the relay is associated is deenergized.

The assembly may be maintained in any suitable manner, the arrangement shown including in addition to the parts previously described non-magnetic members 41, 42 which may be of insulating material, screws 43, 44 and one or more bolts 45 provided with a spacer 46. As shown, the fixed contacts 22, of which there is one on each side of the core of the holding winding 24, are mounted on a block 47 of suitable insulating material secured to the member 37. While Fig. 1 shows a side view of only one relay for the purpose of illustrating my invention, it will be obvious that two such relay units may be mounted in a single case where it is desired to protect two parallel lines in the manner shown in Fig. 2.

If the connections of the operating and restraining windings 17 and 18 to the respective lines are such that the fluxes in the cores 25 and 26 are in the same direction, when the two line currents have the same direction, and the magnetic circuits of the windings 17 and 18 are substantially identical throughout, then regardless of the direction of current so long as it is the same in both lines, the characteristic of the relay 15 remains substantially the same except as affected by the change in voltage. This will be apparent from the solid line curves A, B of Fig. 4 which correspond to zero and normal line voltage respectively. From these characteristics A and B it will be apparent that the generally straight portion of these characteristics has substantially the same slope but the minimum operating value of current effective to move the armature 16 to the contact controlling position is increased by the effect of the voltage restraint. If there were no biasing means like the spring 39, the curve A would tend to pass through the origin 0 but the spring requires at zero voltage and zero restraining current a minimum operating current 0—1. At normal voltage and zero restraining current, however, the minimum operating current is increased by 1—2 or from 0—1 to 0—2. This increase in the minimum operating current falls off until it reaches a substantially steady value where the curves A and B become substantially parallel. Thus, for any given restraining current in one of the parallel lines 7 or 8, the minimum value of the operating current in the other line effective to move the armature to circuit closing position is dependent on the voltage of the other line and increases in accordance with said voltage. Consequently, so long as a sound line condition is indicated by means of normal voltage, the sensitivity of the relay is decreased. Similarly, if only one line, for example 7, is in service, then its associated relay will, under normal voltage conditions on this line, although there is no restraint from the current winding 18, have its contacts 22 and 23 maintained open under the effect of the voltage restraining winding 20 which increases the minimum effective operating value of current at zero current restraint by the amount 1—2. Consequently, the sequence of the closing of the switches in line 8 at the ends thereof will not interfere with restoring this line to service, as in the case of certain prior art devices when current conditions are normal, since the only effect is to add the restraint of the current restraining winding 18 to the relay whose contacts are already held open.

If, however, the relative directions of the currents in the two lines should differ due to reversal of power in one line, then the relay characteristic may become as indicated by the broken line curves C and D of Fig 4, which represent respectively conditions under zero voltage and normal voltage of the line. This occurs as a result of a change in flux circuits since a flux dependent on the operating and restraining magnetomotive forces tends to circulate in the magnetic circuit formed by the armature 16, the core 25, the yoke 27 and the core 26. A flux dependent on the difference between the operating and restraining magnetomotive forces tends to circulate in the intermediate member 28 through the bearing gap to the armature. It will be observed, however, that in general the characteristics C and D are similar to the characteristics A and B, particularly in so far as the change in sensitivity of the relay is concerned. It will be further observed that the slope of the substantially straight portion of the characteristics C and D is less than that of the characteristics A and B. In other words, the relay is more sensitive, that is, it operates on a lower ratio between the operating and restraining currents. This feature enables a wider application of the relay to the balanced protection of parallel lines because in cases where the generating capacity at the end nearest the fault is very low and where there may not be sufficient unbalance to operate on the characteristics A and B, it is possible to obtain action on currents fed from synchronous condensers or induction motors.

In general, the characteristics under different directions of current flow in the two lines 7 and 8 can be governed by suitably adjusting the operating and restraining gaps, particularly with respect to the bearing gap. The lower the reluctance of the bearing gap, the less its effect on the distribution of the operating and restraining fluxes and the more nearly the characteristics A and C and also B and D become alike.

It will be observed that whenever the operating winding 17 predominates over the restraining windings 18 and 20 and the spring, the effect of the operating winding is increased while the effect of the restraining windings is decreased because the reluctance of the magnetic circuit of the operating winding is decreased while the reluctances of the magnetic circuits of the restraining windings are increased. This feature, together with the fact that the movement of the armature is comparatively small and that the armature has relatively low inertia, results in a high speed circuit controlling action such that it is possible in conjunction with suitable high speed interrupting means to avoid unstable system conditions by quickly eliminating a faulty portion of the system.

In Fig. 3 I have shown in a single-phase diagram for simplicity an embodiment of my invention in an electric system including inductive apparatus subject to magnetizing inrush currents, for example a power transformer 50 the circuit of whose windings is arranged to be controlled by suitable circuit breakers 9 and 10 in response to faults on the power transformer 50. I have illustrated a current balance protective arrangement which operates in response to the sum of and the difference between the currents on the two sides of the transformer and which includes the novel features of my invention. The protective arrangement embodies a protective circuit 51 including current transformers 52, 53 connected cumulatively for circulating current. In series with the protective circuit 51 there is connected the current restraining winding 18 of a differential relay 15 constructed in accordance with my invention. The operating winding 17 of this relay is connected across equi-potential points 54 and 55 of the protective circuit 51, the point 55 being an intermediate point of the restraining winding 18.

In order to prevent unnecessary operation of the relay on abnormal system conditions, such as surges which result from switching of the power transformer 50, I provide means responsive to the system voltage for reducing the sensitivity of the relay 15. As shown, this means includes a time delay-opening instantaneous-closing relay 56 responsive to the voltage of the power transformer circuit through suitable means such as a potential transformer 57 to control the energization of the restraining winding 20 of the relay 15. Thus, when the relay 56 is deenergized and also for a predetermined time after the energization of the power transformer circuit, the restraining winding 20 assists the restraining winding 18 to reduce the sensitivity of the relay 15. As long as the restraining winding 20 is energized, the sensitivity of the relay will be in accordance with the characteristic B of Fig. 4. Upon the expiration of the time taken by the relay 56 to open its contacts in circuit with the winding 20, the restraint thereof will be removed and the sensitivity will be for example in accordance with the characteristic A of Fig. 4.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. A protective arrangement for an electric system including circuit interrupting means and controlling means therefor including a relay having a movable member, restraining and operating means for controlling the movement of said member in accordance with the relative values of two electric quantities of the system and means operative on said member for varying in accordance with a condition of the system the minimum operating value of one of said quantities effective to move said member whereby to change the sensitivity of the relay.

2. A protective arrangement for an electric system including circuit interrupting means and controlling means therefor including a relay having a movable armature, restraining and operating means for controlling the movement of said armature in accordance with the relative values of the current of the system at two points thereof and means operative on said member for varying in accordance with a voltage of the system the minimum operating value of current effective to move said armature whereby to change the sensitivity of the relay.

3. A protective arrangement for an electric system including circuit interrupting means and controlling means therefor including a relay having a movable armature, electromagnetic restraining and operating means for controlling the movement of said armature in accordance with the relative values of the current of the system at two points thereof and electromagnetic means operative on said movable member for exerting a further restraining effect dependent on a voltage of the system.

4. A protective arrangement for an electric system including circuit interrupting means, controlling means therefor including a relay having a movable member, restraining and operating means for controlling the movement of said member including windings respectively connected to be energized in accordance with the value of an electric quantity of the system at two points thereof and another restraining means for increasing in accordance with a voltage of the system the minimum operating value of the current in the operating winding effective to move the armature.

5. A protective arrangement for two parallel electric circuits including a circuit breaker for each of said circuits and means for selectively controlling the opening of said circuit breakers in accordance with the relative values of the currents in said circuits including for each circuit a relay having a movable member and controlling means therefor including an operating winding connected to be energized in accordance with the current of the associated circuit, a restraining winding connected to be energized in accordance with the current in the other circuit and means for exerting a further restraining effect on said member including a winding connected to be energized in accordance with the voltage of the associated circuit for increasing in accordance with said voltage the minimum operating value of current effective to move said member.

6. A protective arrangement for two parallel electric circuits including a circuit breaker for each of said circuits and means for selectively controlling the opening of said circuit breakers in accordance with the relative values of the currents in said circuits including for each circuit a relay having a movable member and controlling means therefor including an operating winding connected to be energized in accordance with the current of the associated circuit, a restraining winding connected to be energized in accordance with the current in the other circuit and another restraining means including a winding for varying in accordance with the voltage of the associated circuit the minimum operating value of current effective to move said member.

7. A protective arrangement for an electric system having two parallel circuits, circuit interrupting means for one of said circuits and means for controlling said interrupting means in accordance with the relative values of the currents in said circuits including a relay having a movable member and controlling means therefor including operating and restraining means respectively connected to be energized in accordance with the currents of said circuits and another restraining means connected to be energized in accordance with the voltage of one of said circuits.

8. A protective arrangement for an electric system having two parallel circuits, circuit interrupting means for one of said circuits and means for controlling said interrupting means in accordance with the relative values of the currents in said circuits including a relay having a movable member, contacts controlled by said member and means for controlling said member including an operating winding connected to be energized in accordance with the current of one of said circuits, a restraining winding connected to be energized in accordance with the current of the other circuit and another restraining winding connected to be energized in accordance with the voltage of said one of said circuits for varying in accordance with said voltage the minimum operating value of current effective to move said member to contact controlling position.

9. A protective arrangement for an electric system having two parallel circuits, circuit interrupting means for one of said circuits and means for controlling said interrupting means in accordance with the relative values of the currents in said circuits including a relay having a movable member and controlling means therefor including operating and restraining means respectivey connected to be energized in accordance with the currents of said circuits, said current operating and restraining means being so proportioned and arranged as to vary the sensitivity of the relay in accordance with the relative directions of the currents in said circuits.

10. A protective arrangement for an electric system having two parallel circuits including a circuit breaker for each of said circuits and means for selectively controlling the opening of said circuit breakers in accordance with the relative values of the currents in said circuits including for each circuit a relay having a movable member and controlling means therefor including an operating winding connected to be energized in accordance with the current of the associated circuit, a restraining winding connected to be energized in accordance with the current in the other circuit, the magnetic circuits of said current operating and restraining windings being proportioned and arranged to increase the sensitivity of the relay when the direction of power in one of said circuits reverses and another restraining means including a winding for varying in accordance with the voltage of the associated circuit the minimum operating value of current effective to move said member.

11. A relay including a pivotally mounted armature, electromagnetic operating and restraining means for exerting opposing effects on said armature, a second electromagnetic restraining means having a magnetic circuit substantially magnetically independent of said armature and including a magnetic member movable with said armature.

12. A relay including a pivotally mounted main armature, electromagnetic operating and restraining means for exerting opposing effects on said main armature, a second electromagnetic restraining means having a magnetic circuit substantially magnetically independent of said main armature and including an auxiliary armature loosely mounted on but movable with said main armature.

13. A relay including a pivotally mounted armature, electromagnetic operating and restraining means for exerting opposing effects on said armature, a second electromagnetic restraining means having a magnetic circuit substantially magnetically independent of said armature and including a magnetic member movable with said armature, the winding of said second electromagnetic restraining means being substantially enclosed by magnetic material to minimize the effect of leakage flux on said armature.

14. A relay including a pivotally mounted armature, electromagnetic operating and restraining means for exerting opposing effects on said armature, a shading winding for each of said operating and restraining means, a second electromagnetic restraining means having a magnetic circuit substantially magnetically independent of said armature and including a magnetic member carried by said armature and movable relatively thereto.

15. A relay including a pivotally mounted armature, electromagnetic operating and restraining means for exerting opposing effects on said armature, a second electromagnetic restraining means having a magnetic circuit substantially magnetically independent of said armature and including a magnetic member movable with said armature, contacts controlled by the movement of said armature and arranged to be closed when said operating means predominates over both of said restraining means and means dependent on the closing of said contacts for holding the contacts closed including electromagnetic means operative on said armature and having a winding connected in series with said contacts.

16. A relay including a pivotally mounted armature, electromagnetic operating and restraining means for exerting opposing effects on said armature, a second electromagnetic restraining means having a magnetic circuit substantially magnetically independent of said armature and including a magnetic member movable with said armature, contacts controlled by the movement of said armature and arranged to be closed when said operating means predominates over both of said restraining means and means dependent on the closing of said contacts for maintaining the contacts closed.

17. A relay including a pivotally mounted armature, electromagnetic operating and restraining means for exerting opposing effects on said armature, the magnetic circuits of said operating and restraining means being so proportioned and arranged as to vary the sensitivity of the relay in response to a reversal in the direction of the flux in one circuit relatively to the direction of the flux in the other circuit.

18. A relay including a pivotally mounted armature, electromagnetic operating and restraining means for exerting opposing effects on said armature, the magnetic circuits of said operating and restraining means being so proportioned and arranged as to vary the sensitivity of the relay when the direction of the flux in one circuit is reversed relatively to the direction of the flux in the other, a second electromagnetic restraining means having a magnetic circuit substantially magnetically independent of said armature and including a magnetic member movable with said armature.

19. A protective arrangement for an electric system including two parallel circuits, circuit interrupting means, controlling means therefor including relay means having a movable member, restraining and operating means for controlling the movement of said member respectively connected to be energized in accordance with the currents of said circuits and means responsive to a voltage of the system for controlling the sensitivity of said relay means.

20. A protective arrangement for an electric system including two parallel circuits, circuit interrupting means, means for controlling the operation thereof including relay means having a movable member, restraining and operating means for controlling the movement of said member respectively connected to be energized in accordance with the currents of said circuits and means responsive to a voltage of the system for effecting a circuit controlling operation of said interrupting means at a predetermined difference between the circuit currents when said voltage has a given value and at a greater predetermined difference between the circuit currents when the voltage has a higher value.

In witness whereof, I have hereunto set my hand this 22d day of May, 1930.

LUKE F. KENNEDY.